United States Patent [19]

Chayet

[11] 4,060,071
[45] Nov. 29, 1977

[54] SOLAR COLLECTOR FOR SOLAR HEATING SYSTEMS

[75] Inventor: Emil L. Chayet, Largo, Fla.

[73] Assignee: Solar Energy Dynamics Corporation, Tampa, Fla.

[21] Appl. No.: 696,988

[22] Filed: June 17, 1976

[51] Int. Cl.$^2$ .................................................. F24J 3/02
[52] U.S. Cl. .................................... 126/271; 165/170; 165/171
[58] Field of Search ............... 126/270, 271; 237/1 A; 60/641; 165/170, 171

[56] References Cited

U.S. PATENT DOCUMENTS

| | | | |
|---|---|---|---|
| 1,747,826 | 2/1930 | Gould | 126/271 |
| 2,552,237 | 5/1951 | Trombe | 126/271 |
| 3,200,820 | 8/1965 | Garrett | 126/271 |
| 3,927,659 | 12/1975 | Blake | 60/641 |

Primary Examiner—Kenneth W. Sprague
Assistant Examiner—James C. Yeung
Attorney, Agent, or Firm—Pollock, Vande Sande and Priddy

[57] ABSTRACT

A solar heating system includes a solar collector comprising a continuous length of copper tubing coiled into a helical array of closely adjacent turns and supported within a sealed housing. The outer turns of the array are fabricated of tubing having a greater diameter than the tubing which forms the inner turns of the array, and the total length of the larger diameter tubing in the array is greater than that of the smaller diameter tubing. The relationships beween the tubing diameters and lengths are selected to achieve a desired flow rate and temperature rise for the overall array. The array is supported within the housing by copper sheets which also operate to eliminate moisture condensation within the housing.

10 Claims, 2 Drawing Figures

SOLAR COLLECTOR FOR SOLAR HEATING SYSTEMS

BACKGROUND OF THE INVENTION

The present invention relates to improved solar heating arrangements, and is more particularly concerned with a solar collector adapted for use in a system of the type described in my prior copending application Ser. No. 665,648 filed Mar. 10, 1976, for Closed System Solar Heater, now U.S. Pat. No. 4,010,734, issued Mar. 8, 1977, the disclosure of which is incorporated herein by reference.

Various forms of solar heating system have been suggested heretofore which use energy from the sun as a source of heat. In general, such systems include a solar collector structure arranged to permit the flow of an appropriate medium, such as water, therethrough and adapted to cause said medium to be heated as it flows through the collector due to solar radiant energy incident on the collector; and the solar collector structure in turn forms part of an overall solar heating system arranged to permit immediate use of the heated medium, or adapted to provide storage of the heated medium for later utilization.

A wide variety of solar collector structures have been suggested heretofore. In some cases, the collector comprises a continuous length of tubing through which water may flow, with the tubing being coiled into a variety of configurations e.g., as shown in Gould U.S. Pat. No. 1,747,826, Trombe U.S. Pat. No. 2,552,237, Fox U.S. Pat. No. 2,978,562, Garrett U.S. Pat. No. 3,200,820, Thomason U.S. Pat. No. 3,215,134, Thannhauser U.S. Pat. No. 3,254,644, and Long U.S. Pat. No. 3,778,578. One comparatively accepted collector of the tubing type employs a tubular array in association with a superposed metallic plate which operates to heat water flowing through the tubing in a three-step transfer process, i.e., the plate is first heated by incident radiant energy, with the heated plate in turn heating the tubing, which then heats water flowing through the tubing. This technique requires successive heat transfer steps which have been found in practice to be somewhat inefficient. As will appear hereinafter, the collector of the present invention, by arranging the tubing itself so that it acts as a radiant energy adsorptive plate, eliminates one of the aforementioned heat transfer steps and similarly eliminates a related source of energy loss, with a resultant significant increase in efficiency.

In tubing-type solar collectors which have been suggested heretofore, the actual quantity of water which passes through the array, and the temperature to which it is heated, depends upon the dimensions of the tubing used in the array. It has been the standard practice heretofore to employ tubing of a single diameter throughout the array and, in such an arrangement, an increase in the tubing diameter tends to achieve a greater quantity of water flow through the array, but effects less heat per unit volume of flow. Conversely, a decrease in the diameter of the tubing, when uniform diameter tubing is used throughout, decreases the quantity of flow but increases the temperature to which the water is heated and, indeed, the reduction in tubing diameter can be such that the solar collector produces sufficient heat to convert the flowing water to steam, a result which may be desirable for some applications but which is undesirable when the collector is to be employed as part of a residential water heating system. In an effort to achieve an adequate flow rate and an adequate temperature rise, it has been the practice heretofore in connection with tubing-type solar collectors to select the tubing diameter and tubing length in the collector in a fashion which achieves a compromise between these two factors. However, since it has been customary to use tubing of a single diameter throughout the array, the result of the compromise has been less than entirely satisfactory in relation to one factor or the other. Where adequate flow rates have been achieved, the total temperature rise is usually too small; and where an adequate temperature rise has been achieved the total volumetric flow is often insufficient to satisfy normal residential requirements.

SUMMARY OF THE INVENTION

The present invention obviates the foregoing problems by providing a solar collector of the tubing-type so arranged that the tubing array directly performs the function of heat adsorptive plates commonly employed heretofore, thereby increasing the efficiency of the collector over that of plate-type collectors. In addition, the array employs concentric tubing sections having different tubing diameters and different tubing lengths which are disposed in series flow communication with one another, with the different tubing diameters and lengths being appropriately related to one another to achieve a desired total flow and a desired temperature rise across the complete array.

The tubing is preferably coiled into a substantially planar helical array of closely adjacent turns which is supported within a sealed housing having a transparent face adapted to admit solar radiation to the interior of the housing for heating the tubing array and any water passing therethrough. The tubing array comprises first and second pluralities of helical turns disposed in series flow communication with one another between the outer and inner peripheries of the array respectively, and the first plurality of turns adjacent the outer periphery of the array has a larger tubing diameter and a greater total tubing length than that of the second plurality of turns adjacent the center of the array. In a preferred embodiment of the invention, the ratio of the larger tubing diameter to the smaller tubing diameter is substantially 1.33 to 1.0, and the total length of the larger diameter tubing is substantially 1.66 that of the total length of the smaller diameter tubing.

The helical tubing array is so arranged that adjacent turns in the array are contiguous with one another and are fastened to one another, e.g., by soldering, to give the overall array a plate-like rigidity and function. The array is supported within the housing by fastening the turns of the helix to copper sheets which are, in turn, attached to interior fixed portions of the housing structure. The copper sheets, in addition to acting as a support for the helix, reduce condensation within the housing when the helix first starts to heat due to incident solar radiation. Since the copper sheets have a considerably smaller mass than that of the tubing array, the sheets tend to heat more quickly than the tubing and expedite heating of the air pocket within the housing, to prevent moisture condensation on the underside of the transparent face of the housing and the consequent reduction in efficiency of the solar heater which would result from such condensation.

BRIEF DESCRIPTION OF THE DRAWINGS

The foregoing objects, advantages, construction and operation of the present invention will become more readily apparent from the following description and accompanying drawings in which.

DESCRIPTION OF THE PREFERRED EMBODIMENTS

Figure 1:
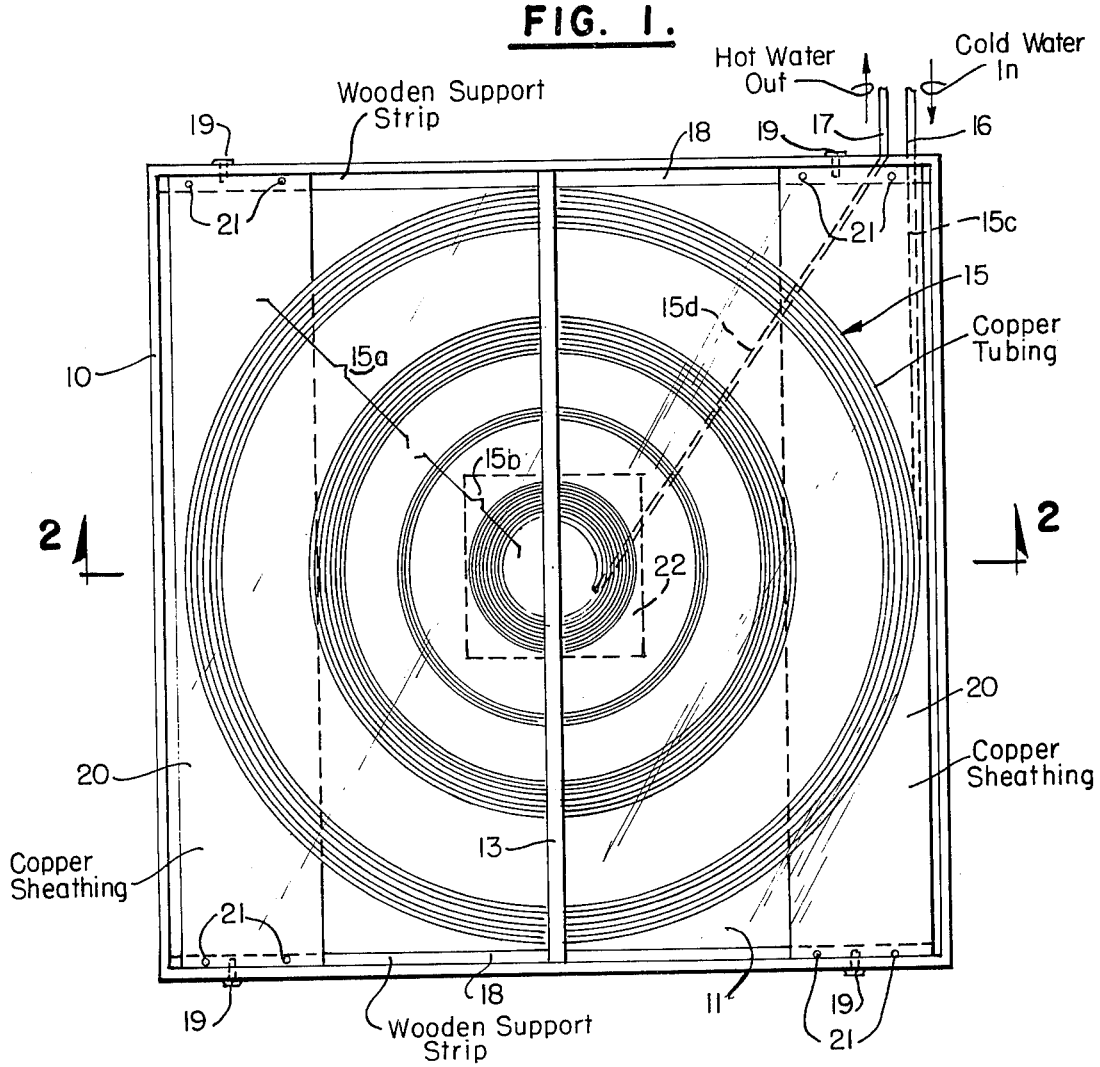
FIG. 1 is a plan view of a solar collector constructed is accordance with the present invention.
Figure 2:
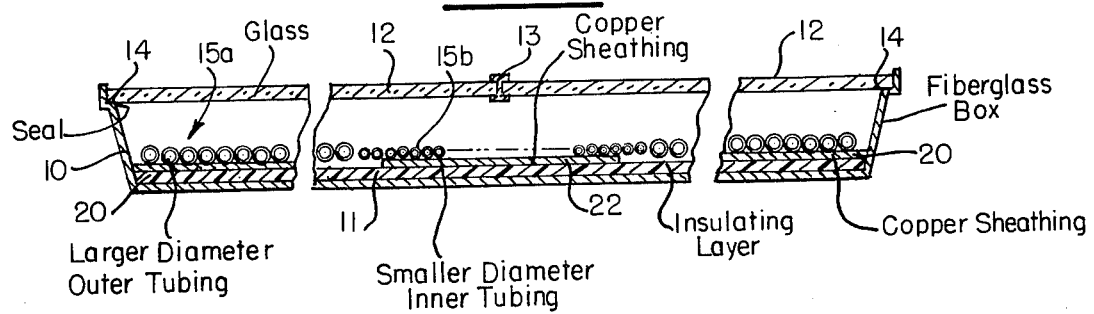
FIG. 2 is a cross section taken on line 2—2 of FIG. 1.

The solar collector shown in FIGS. 1 and 2 is adapted to be mounted on the roof of a house, or at some other appropriate location, and is operative to admit solar radiation to heat a supply of water passing through the solar collector. The solar collector can comprise a portion of an overall solar heating system of the type described in my aforementioned prior copending application Ser. No. 665,648, now Pat. No. 4,010,734 wherein the solar collector is associated with a water storage tank, a cold water line extending from the bottom of the tank to the outermost turn of the solar collector, a hot water return line extending from the innermost turn of the solar collector through a heat trap to a water inlet adjacent the top of the tank, and a temperature responsive control and pumping system operative to selectively effect a flow of cold water from the storage tank through the solar collector to force hot water out of the solar collector back into the storage tank. The arrangement of said prior copending application contains a number of features which, when associated with the solar collector of the instant application, produce an overall system of particularly high efficiency; but it must be understood that the solar collector of the present invention can be used in solar heating systems of other types, and nevertheless improves the efficiency and operating characteristics of such other systems due to the advantageous aspects of the solar collector itself.

Briefly, the solar collector comprises a helical configuration of copper tubing, consisting of at least two different diameter tubing sections having differing lengths from one another, to determine the volume off flow and intensity of heat absorption as water passes through the helical array. The copper tubing is coiled so that substantially 90% of the tubing touches itself within the coil, whereby the tubing becomes its own absorption plate and has an even greater exposed area than would be the case with a flat plate. This tubing array is, indeed, more efficient than a plate-type collector since the heat loss which occurs in the transfer of energy from the plate to the tubing is eliminated.

The solar collector comprisies a fiber glass housing 10 which can be color coated during manufacture to match an individual roof color. The major area of the housing or fiber glass box 10 is substantially rectangular, and is dimensioned in one form of the invention with a length and width of substantially 4 feet 9 inches each, and a depth of substantially 4 inches. The bottom of the housing contains an insulating base layer 11, fabricated for example of one-inch thick urethane, which provides added stability to the fiber glass box and which also provides insulation necessary to retain heat within the box. A layer of black roofing felt covers the urethane layer 11 to provide additional insulation.

The uppermost face of the box is transparent, and comprises two lites of double strength window glass 12 which are divided by a mullion 13 and which are sealed to the upper periphery of the box, as at 14 with a clear silicone composition. Window glass 12 preferably comprises a material having a low iron content. The sealing arrangement creates a heat pocket within the housing 10 immediately beneath the glass since such low iron content glass captures the long rays of the light spectrum and will retain the heat within the housing inasmuch as such long rays will not reflect back through the glass.

A continuous length of copper tubing 15 is coiled into a substantially planar helical array of closely adjacent turns, and is supported within the aforementioned heat pocket (by a support arrangement which will be described hereinafter) so that the plane of the array extends substantially parallel to the plane of glass cover plate 12 at a position within the housing between insulating layer 11 and the glass cover plate 12. Helical array 15 includes two pluralities of turns which exhibit differing tubing diameters and differing lengths respectively. More particularly, the array comprises an outer plurality of turns 15a which is fabricated of a larger diameter tubing than that employed in an inner plurality of turns 15b; and the two sections 15a and 15b of the overall tubing array are disposed in concentric series flow communication with one another. The outermost turn of larger diameter tubing 15a is connected via line 15c to a cold water inlet line 16, and the innermost turn of the smaller diameter tubing section 15b is connected via a further line 15d to a hot water outlet line 17. Lines 16, 17 pass through and are sealed into a side wall of housing 10 in close proximity to one another to facilitate water line connection between the solar collector and remaining portions of the overall solar heating system with which it is associated. Cold water supplied through inlet 16 passes through the several turns of tubing section 15a in sequence, continues without interruption toward the center of the array through the successive turns of smaller diameter tubing section 15b, and then passes in its heated condition through line 15d to hot water outlet 17.

The tubing diameters and tubing lengths employed in sections 15a and 15b of the array are selected to assure that the total volume of water flowing through the collector, and the temperature to which it is heated as it flows from the outermost to the innermost turn of the array, each fall within satisfactory limits. The smaller diameter tubing which is employed in section 15b of the array introduces hydrodynamic resistance into the flow path which reduces the rate of flow and thereby increases the temperature to which the water is heated in its passage from inlet 16 to outlet 17. The use of the larger diameter tubing in section 15a of the array, on the other hand, permits the total volume of flow through the array to be increased to a practical quantity without an excessive reduction in temperature. In order to achieve practical temperature increases across the array along with practical quantities of water flow through the array, it has been found that certain relationships must be observed:

a. The larger diameter tubing portion of the array should be positioned radially outwards relative to the smaller diameter tubing portion of the array, and the water flow through the array should be directed in an inward direction, i.e., from the outermost periphery toward the center of the array;

b. The larger diameter tubing should have a greater total length than the smaller diameter tubing employed in the array. It has been determined empirically that the length ratios should be in the range of 2:1 to 1.5:1, and best results are achieved when the length ratio is substantially 1.666:1 ± 5%;

c. The ratio between the diameters of the larger diameter tubing portion of the array and the smaller diameter tubing portion of the array should be substantially 1.33:1.

When the collector is used in a system of the type described in my aforementioned prior copending application, the lengths and diameters of the copper tubing leading from the water storage tank to the solar collector, and extending from the solar collector back to the water tank, will affect the total volume of water flowing between the collector and tank. If the collector is comparatively close to the hot water storage tank, the lines between the collector and storage tank should have an inside diameter substantially equal to the inside diameter of the larger diameter tubing of the solar collector. In the case of longer installations, however, where the collector is comparatively far from the storage tank, the lines between the tank and collector should be increased in diameter somewhat; and it has been found that in installations of this latter type, the lines leading to and from the collector should have an inside diameter which is substantially 33% larger than the inside diameter of the larger tubing portion of the collector.

In a practical example of a solar collector constructed in accordance with the foregoing considerations, the collector was formed by first tightly coiling substantially 150 feet of three-eights inch OD copper pipe to form section 15b of the collector, followed by the further tight coiling of substantially 250 feet of one-half inch OD copper pipe to form section 15a. Satisfactory results were achieved when the total length of pipe employed in either section of the collector varied from the stated length by as much as 7.5 feet, plus or minus. When the collector was to be located comparatively close to an associated hot water storage tank, the lines connecting the collector to the tank had the same diameter as that employed in the larger diameter section 15a of the collector. However when the collector was to be comparatively remote from the storage tank, the lines leading to and from the tank were given an inside diameter of one-half inch, instead of the one-half inch outside diameter employed in tubing section 15a of the collector. A collector constructed in accordance with these dimensions, and in accordance with the other structural considerations described herein, was found to readily provide 15-20 gallons per hour of water heated to substantially 175° F. under good solar conditions.

After the copper tubing is tightly coiled to form the helical array described above, the adjacent turns of the helix are preferably soldered to one another. This increases thermal flow, and also provides the helix with structural rigidity so as to prevent the coil turns from being displaced or shifting relative to one another due to temperature changes within the helix.

The assembled helix is mounted within housing 10 in a plane substantially parallel to that of glass face 12. The mounting is accomplished by attaching a pair of spaced wooden support strips 18 to the interior of the housing, adjacent its bottom, by fasteners 19 passing through the sides of the housing, by soldering a pair of elongated, spaced, substantially parallel copper sheets 20 to diametrically opposed portions of the lower surface of helix 15, and by then attaching the opposing ends of the copper sheets 20 to the wooden strips 18, as at 21.

The copper sheets 20, in addition to providing good support for the helix 15 within fiber glass box 10, also increase the overall efficiency of the solar collector by minimizing or eliminating the formation of condensation within the box 10 on the undersurface of glass 12. When the solar collector first starts to heat, e.g., at sunrise, the solar radiation tends to heat copper sheets 20 more quickly than helical array 15 due to the comparatively low mass of the sheets 20, and the heated sheets 20 in turn operate to start heating the heat pocket within the solar collector immediately. As a result, when cold water starts to flow through the helical array, there is no significant condensation of water within housing 10. If these considerations were not observed, the moisture condensation which would otherwise tend to occur would accumulate as a mist on the underside of glass 12, since housing 10 is substantially sealed, and would seriously reduce the initial efficiency of the solar heater. To enhance the anti-condensation effect of copper sheets 20, it is preferable that a further copper sheet 22 be soldered to the underside of helical array 15, below the central opening in that array.

After the helical array 15 has been formed, attached to copper sheets 20 and 22, and mounted within housing 10 as described, all exposed copper and the complete under surface of the solar collector, is coated with a radiation absorptive material, e.g., by painting the same black with a paint having a high carbon black content. The glass cover 12 is then mounted in place across the top of the collector, and sealed to its outer periphery. It should be understood that, in using the term "seal" herein, in relation to cover 12 and in relation to the passage of line, 16, 17 through the sides of housing 10, it is not necessary to proper operation of the collector that an absolutely airtight or hemetic seal be achieved; all that is necessary is to assure that the interior of the collector is sufficiently isolated from the environment to prevent the ingress of any significant dirt or moisture which, over a period of time, might degrade the efficiency of the collector.

While I have thus described preferred embodiments of the present invention, many variations will be apparent to those skilled in the art. For example, while the helical array 15 has been described as one exhibiting substantially circular turns, the term "helical array" employed herein is intended to cover planar tubing structures having other geometric outlines as well, e.g., rectangular helical arrays which would more completely fill a rectangular housing of the type illustrated, or arrays having elliptical or other geometric shapes. It must therefore be understood that the foregoing description is intended to be illustrative only and not limitative of the present invention, and all such variations and modifications as are in accord with the principles described are meant to fall within the scope of the appended claims.

Having thus described my invention I claim:

1. A solar collector for use in a solar heating system, comprising a sealed housing, one face of said housing being planar and being transparent to admit solar radiation to the interior of said housing, a continuous length of tubing tightly coiled in a substantially flat planar helical array of closely adjacent contiguous turns, means for supporting said flat planar helical tubing array within said housing with the plane of said array being disposed substantially parallel to the plane of said transparent housing face, said array comprising two pluralities of helical turns respectively connected in series flow communication with one another and respectively disposed in concentric, substantially coplanar relation to one another, the diameters of the tubings in said two pluralities of helical turns respectively differing from one another, a flow inlet line connected to the larger diameter tubing one of said two pluralities of helical turns and a flow outlet line connected to the smaller diameter tubing one of said two pluralities of helical turns.

2. The collector of claim 1 wherein the larger diameter tubing one of said two pluralities of helical turns extends in the plane of said array between the outer periphery of said planar array and a point in said array spaced from the center of said array, and the smaller diameter tubing one of said two pluralities of helical turns extends in said plane between said point in said array and the center of said array.

3. The collector of claim 2 wherein the ratio between the tubing diameters of said larger diameter tubing and said smaller diameter tubing is substantially 1.33 to 1.

4. The collector of claim 1 wherein the length of the tubing in said larger diameter plurality of turns is greater than the length of the tubing in said smaller diameter tubing plurality of turns.

5. The collector of claim 4 wherein the ratio of said tubing lengths falls within the range of 2:1 to 1.5:1.

6. The collector of claim 4 wherein the ratio of said tubing lengths is substantially 1.66 to 1.

7. The collector of claim 6 wherein the ratio between the tubing diameters of said larger diameter tubing and said smaller diameter tubing is substantially 1.33 to 1.

8. The collector of claim 1 wherein said supporting means comprises a pair of elongated flat planar metallic sheets disposed in spaced substantially parallel relation to one another and substantially parallel to the plane of said array, said metallic sheets being disposed in face-to-face relation to said planar array and being connected respectively to diametrically opposed portions of said planar helical tubing array, and means for fastening the opposing ends of said pair of sheets to fixed interior portions of said housing.

9. The collector of claim 8 including a further flat planar metallic sheet substantially coplanar with, spaced from, and disposed between said pair of elongated planar sheets in face-to-face engagement with the central turns of said flat planar helical tubing array.

10. The collector of claim 9 including a layer of insulating material disposed between said metallic sheets and the face of said housing remote from said transparent face, said flat planar helical array being positioned within said housing between said flat planar metallic sheets and said planar transparent face of said housing, said sheets and said array all being coated with a radiation absorptive material.

* * * * *